United States Patent [19]

Katsuta

[11] Patent Number: 5,274,831
[45] Date of Patent: Dec. 28, 1993

[54] MICROPROCESSOR IN RESPONSE TO AN INTERRUPT REQUEST FOR EXECUTING A MICROINSTRUCTION FOR SAMPLING THE MODE OF OPERATION

[75] Inventor: Hiroshi Katsuta, Tokyo, Japan
[73] Assignee: NEC Corporation, Tokyo, Japan
[21] Appl. No.: 447,290
[22] Filed: Dec. 7, 1989
[30] Foreign Application Priority Data
  Dec. 8, 1988 [JP] Japan .......................... 63-311146
[51] Int. Cl.⁵ ........................... G06F 9/46; G06F 9/00
[52] U.S. Cl. ............................. 395/800; 395/375; 364/230.2; 364/232.9; 364/280.8; 364/DIG. 1
[58] Field of Search ................ 395/775, 425, 800, 375
[56] References Cited
U.S. PATENT DOCUMENTS

| | | | |
|---|---|---|---|
| 4,374,418 | 2/1983 | Catiller et al. | 395/775 |
| 4,519,032 | 5/1985 | Mendell | 395/425 |
| 4,779,187 | 10/1988 | Letwin | 395/725 |
| 4,847,616 | 7/1989 | Gotou et al. | 340/825 |
| 4,930,068 | 5/1990 | Katayose et al. | 395/725 |
| 4,947,315 | 8/1990 | Sokolow et al. | 395/700 |
| 5,021,993 | 6/1991 | Matoba et al. | 395/775 |
| 5,036,458 | 7/1991 | Matsushima et al. | 395/775 |

Primary Examiner—Thomas C. Lee
Assistant Examiner—Paul Harrity

[57] ABSTRACT

A microprocessor having two different modes of operation includes a mode flag which designates one of the two operation modes of the microprocessor, and a central processing unit which executes a program in one of the two operation modes designated by the mode flag. The central processing unit includes a microprogram memory which stores an interrupt initiation microprogram, an output device which is responsive to an interrupt request for reading out the interrupt initiation microprogram from the microprogram memory and a circuit for executing the interrupt initiation microprogram to generate a sampling signal. A mode terminal is provided, which is supplied with operation mode information. A circuit responsive to the sampling signal samples a logic level of the operation mode information at the mode terminal. A circuit is provided, which is responsive to the sampled logic level from the sampling circuit in order to bring the mode flag into one of set and reset states of the mode flag designation.

10 Claims, 4 Drawing Sheets

MICROPROCESSOR IN RESPONSE TO AN INTERRUPT REQUEST FOR EXECUTING A MICROINSTRUCTION FOR SAMPLING THE MODE OF OPERATION

BACKGROUND OF THE INVENTION

1. Field of the Invention

The present invention relates to an information processing apparatus and, more particularly, to a microprocessor executing a program written not only by a native instruction set but also by a different instruction set from the native set.

2. Description of Prior Art

As a microprocessor has advanced in execution function, there has been proposed and made in practical use a microprocessor operable in not only a native mode for executing a program written by a native instruction set, but also in an emulation mode for executing a program having another instruction set which is basically used for operation of another microprocessor. Such a microprocessor has a mode flag for designating the operating mode. This flag constitutes of a part of a program status word register (PSW). When the mode flag is set to logic "1", for example, the microprocessor operates in the native mode. On the other hand, in case of the mode flag being reset to logic "0", the microprocessor operates in the emulation mode. Since the switching in the operating mode means a change in a task environment, it dealt with in an interrupt process. More specifically, when the microprocessor encounters a mode switching instruction from one of the native and emulation modes to the other thereof, the current contents of a program counter (PC), a program status word register (PSW) and a general purpose register (GPR) are saved in a data memory and a branch processing to a vector address is then performed. The content of the mode flag is changed to the designated mode, so that the program for the designated mode is executed. When the execution of the program is completed, the saved contents are returned to PC, PSW and GPR, respectively, to restart the program of the other mode.

In the microprocessor mentioned above, when an interrupt request is externally issued from a peripheral I/O unit to the microprocessor, the mode flag is forcibly set to one of logic "1" and logic "0". When the microprocessor receives the interrupt request, it saves the current contents of PC, PSW and GPR in the data memory and loads the starting address of the interrupt program to PC. The interrupt program routine is thereby initiated. At this time, assuming that the mode flag is forcibly set to logic "1", i.e. the native mode, the microprocessor is brought into the condition in which the interrupt program is executed in the native mode. This means that the interrupt program is restricted to be written by the native instruction set. On the other hand, it is required that the interrupt program is also executed not only in the native mode but also in the emulation mode. For this purpose, the mode switching instruction from the native mode to the emulation mode is provided at the beginning of the emulation mode interrupt program. As described hereinbefore, the microprocessor deals with the mode switching operation in an interrupt handling manner. That is, by executing the mode switching instruction, the contents of PC, PSW and GPR are again saved in the data memory and the vector address information is loaded to PC. The mode flag is reset to logic "0" to designate the emulation mode. When the emulation mode interrupt program is completed, a return instruction is executed to restore the last saved contents in PC, PSW and GPR. The mode flag is thereby set to logic "1". A return instruction is again executed to restore the saved contents for the suspended program in PC, PSW and GPR.

Thus, in order to execute an interrupt program of the emulation mode, the saving and restoring of the contents of PC, PSW and GPR are performed twice, respectively. In particular, the overhead for the second saving and restoring deteriorates the respondence for the interrupt request and the execution efficiency of the microprocessor.

SUMMARY OF THE INVENTION

Therefore, an object of the present invention is to provide an improved microprocessor operable in both of native and emulation modes.

Another object of the present invention is to provide a microprocessor which can executes an interrupt program in a desired one of native and emulation modes without saving the contents of PC, PSW and GPR twice.

A microprocessor according to the present invention comprises a mode flag designating one of a first operation mode in which a program written by a first instruction set is executed and a second operation mode in which a program written by a second instruction set different from the first set is executed, a central processing unit executing the program in one of the first and second operation modes designated by the mode flag, the unit including a microprogram memory for storing a microprogram for a desired processing operation, a mode selection terminal supplied with mode selection information, and a mode flag control circuit sampling the mode selection information at the mode selection terminal in response to a sampling signal generated by executing the microprogram and determining the content of the mode flag in accordance with the sampling resultant data.

In a preferred embodiment of the present invention, the microprogram memory stores an interrupt initiation microprogram which is executed in response to an interrupt request, and the sampling signal is generated by executing the interrupt initiation program. Accordingly, the content of the mode flag is determined by the mode selection information supplied to the terminal at a time when the interrupt request is issued. When the interrupt program is to be executed in the first operation mode, the mode selection information assumes logic "1", for example. As a result, the mode flag designates the first operation mode to the CPU. On the other hand, in case where the interrupt program is to be executed in the second operation mode, the mode selection information assumes logic "0". The CPU is thereby designated to operate in the second operation mode. No mode switching instruction is thus required in the interrupt program.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

Figure 1:
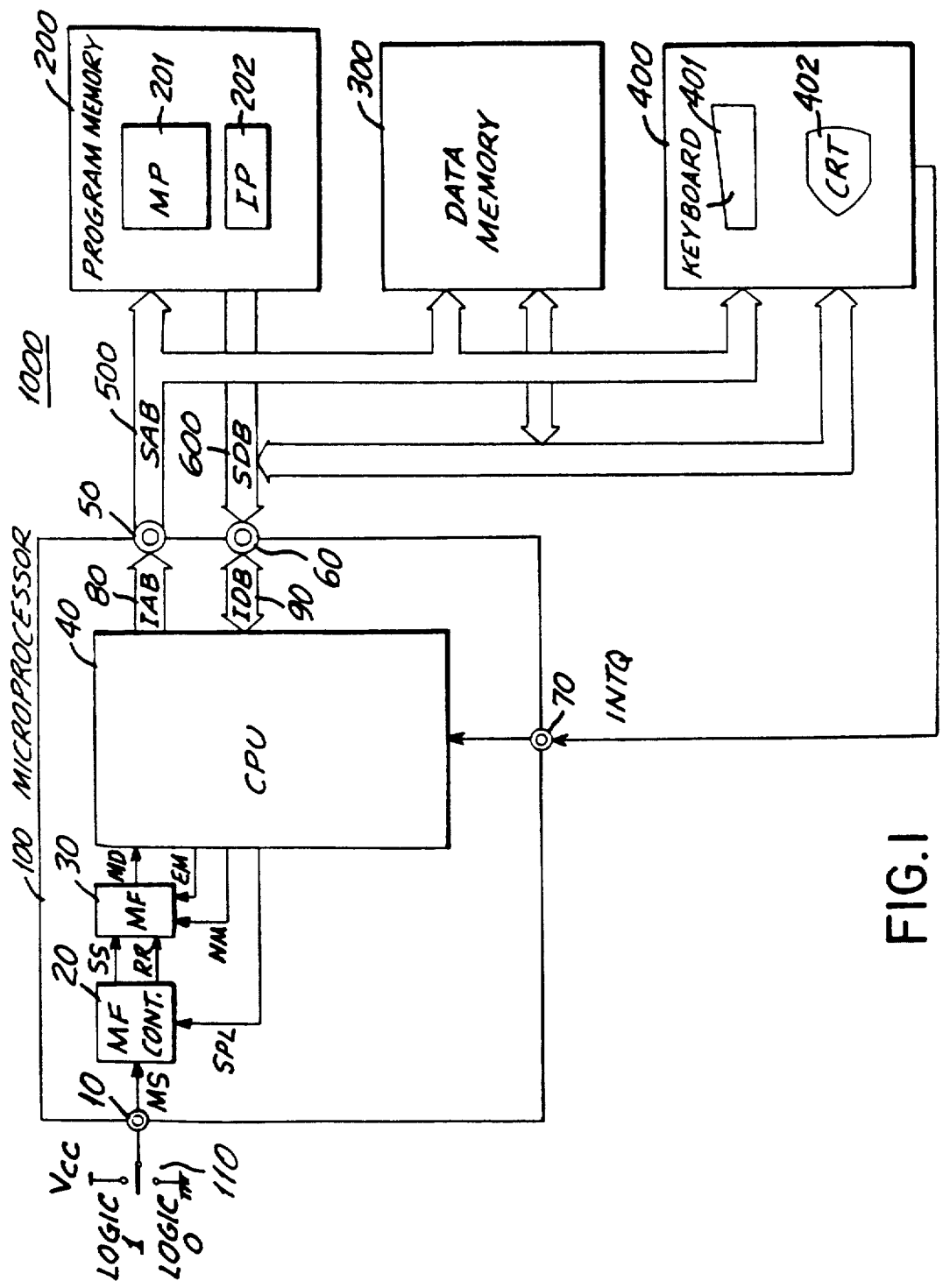
FIG. 1 is a block diagram representative of a microcomputer system employing a microprocess according to an embodiment of the present invention.

Referring to FIG. 1, a microcomputer system 1000 includes a microprocessor 100 according an embodiment of the present invention, a program memory 200, a data memory 300 and a peripheral I/O unit 400 which are interconnected via a system address bus (SAB) 500 and a system data bus (SDB) 600.

The microprocessor 100 includes a central processing unit (CPU) 40 executing a program stored in the program memory 200 in a native mode or an emulation mode designated by a mode designation signal MD of a mode flag (MF) 30. The CPU 40 coupled to SAB 500 through an internal address bus (IAB) 80 and a set of address terminals 50 and further to SDB 600 through an internal data bus (IDB) 90 and a set of data terminals 60. The CPU 40 receives an interrupt request signal INQ via a terminal 70 from the I/O unit 400. The microprocessor 100 further includes a mode selection terminal 10 which is coupled to a mode selection switch 110. This switch 110 applies logic "1" or logic 0 to the terminal as mode selection information MS. This information MS is supplied to a mode flag (MF) control circuit 20. This circuit 20 samples the information MS in response to a sampling signal SPL from the CPU 40 and produces a set signal SS or a reset signal RR in accordance with the sampling resultant. When the switch 110 supplies logic 1 to the terminal 20, MF control circuit 20 produces the set signal SS. On the other hand, in case of logic "0" being supplied to terminal 10, the reset signal RR is produced. In response to the set signal SS, MF 30 is set, so that the signal MD takes logic "1" to designate the native mode to CPU 40. On the other hand, MF 30 is reset in response to the reset signal RR, so that the MD signal tubes logic "0" to designate the emulation mode. MF 30 is further supplied with a native mode switching signal NM and an emulation mode switching signal EM from the CPU 40. When CPU 40 encounters a mode switching instruction read out of the program memory 200, it produces one of the NM and EM signals in accordance with the operation mode to be switched.

The program memory 200 stores a main program (MP) 201 written by a native instruction set or an emulation instruction set or both of the native and emulation instruction sets. When MP 201 is written by both of the native and emulation instruction sets, it includes a mode switching instruction from one of the native and emulation modes to the other thereof. The memory 200 further stores an interrupt program (IP) 202 written by the native instruction set or by the emulation instruction set. Although not shown in the drawing, the data memory 300 includes a stack area into which the current program execution states of CPU 40 are stored. The peripheral I/O unit 400 includes a key board 401, a cathod ray tube (CRT) 402 and so forth. For example, by an operation of a "break" key of the board 401, the interrupt request INTQ is issued to CPU 40.

Figure 2:
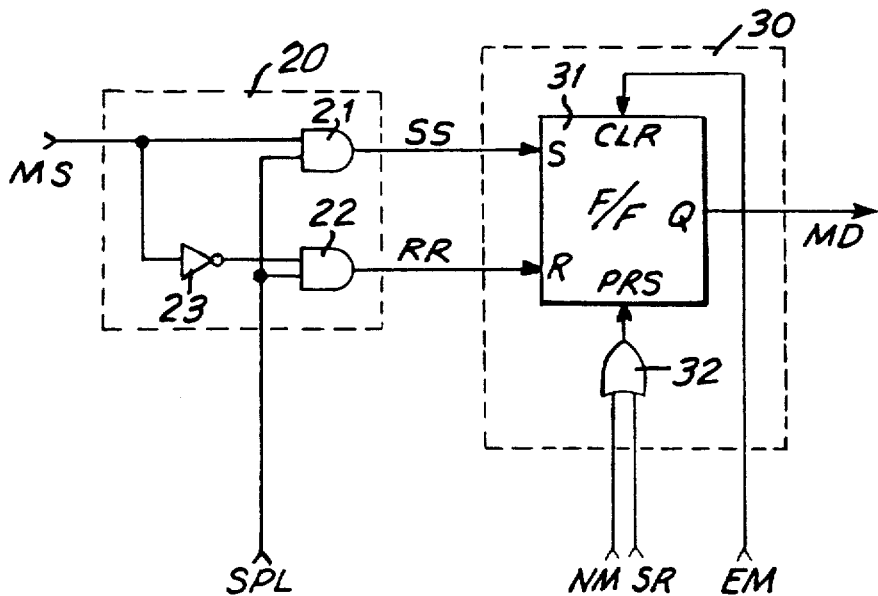
FIG. 2 is a circuit diagram representative of a mode flag (MF) and a mode flag control circuit (MF Cont.) shown in FIG. 1.

Referring to FIG. 2, MF control circuit 20 includes two AND gates 21 and 22 and one inverter 23 which are connected as shown. Accordingly, in response to the sampling signal SPL, the set signal SS is produced when the mode selection signal MS takes logic "1", whereas the reset signal RR is produced when the signal MS takes logic "0". The signals SS and RR are supplied to set and reset terminals S and R of a flip-flop (F/F) circuit 31 in MF 30. F/F circuit 31 further has a clear terminal CLR applied with the EM signal and a preset terminal PRS. Although not shown in FIG. 1, CPU 40 further generates a system reset signal SR by executing a system reset microinstruction, and this signal SR and NM signal are ORed by an OR gate 32 whose output is ±n turn supplied to the preset terminal PRS. The Q output of the F/F circuit 31 is applied to CPU 40 as the mode designation signal MD.

Figure 3:
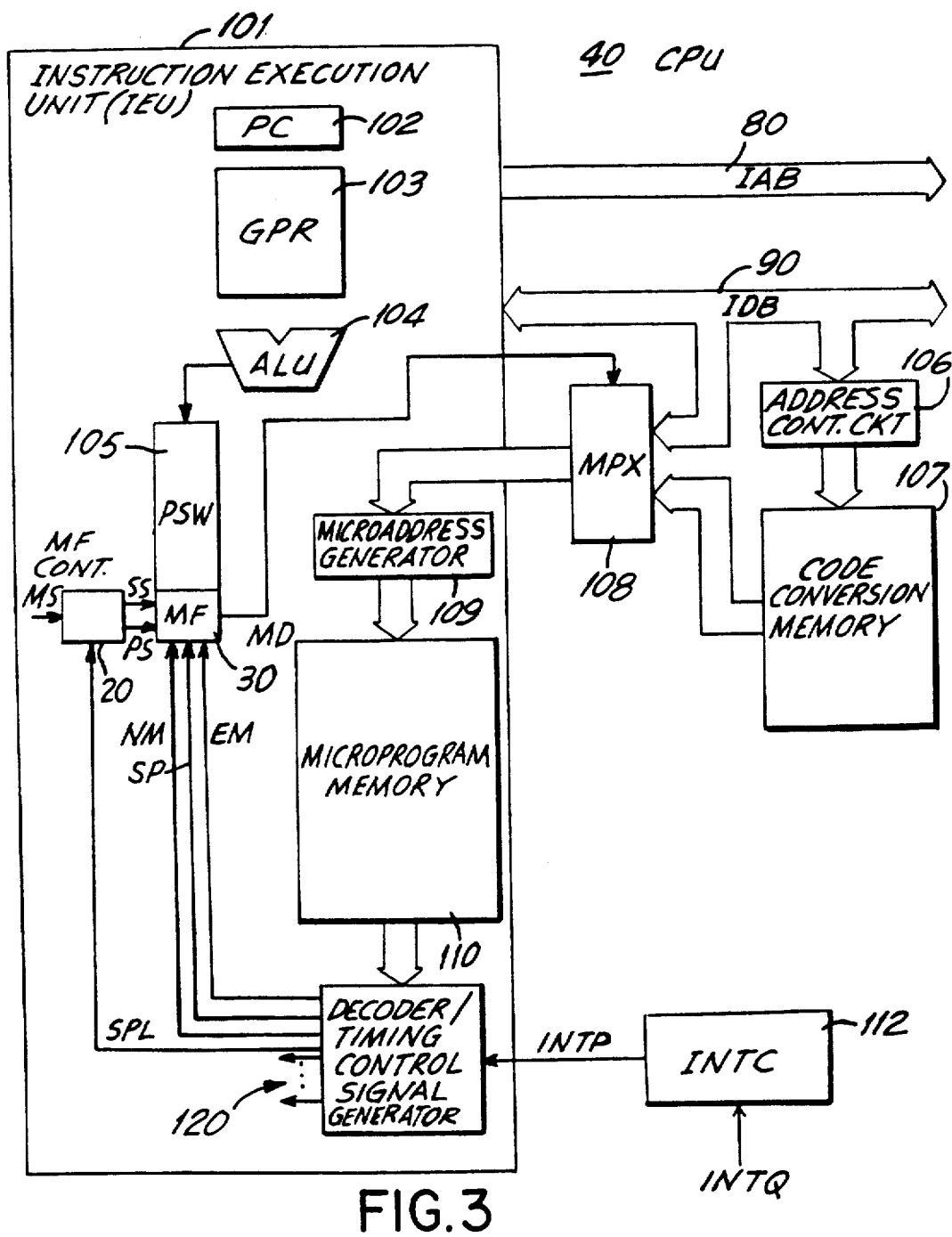
FIG. 3 is a block diagram representative of a CPU shown in FIG. 1.

Referring to FIG. 3, CPU 40 includes an instruction execution unit (IEU) 101 which controls a bus cycle using IAB 80 and IDB 90 to fetch instruction from the program memory 200 or transmit data between the CPU 40 and the data memory 300 or the unit 400. Reference numeral 107 is a code conversion memory which stores respective instruction codes in the native instruction set corresponding to respective instruction codes in the emulation instruction set. Accordingly, an address control circuit 106 responds to the instruction in the emulation instruction set on IDB 90 and generates predetermined address information which is in turn supplied to the code conversion memory 107. The instruction in the native instruction set corresponding to the instruction in the emulation set to be executed is thereby read out of the memory 107 and then supplied to a multiplexer (MPX) 108. MPX 108 is further supplied with the instruction from IDB 90 and is controlled by the mode designation signal MD from MF 30. When the signal MD takes logic "1", MPX 108 selects the instruction from IDB 90. When the signal MD tubes logic "0", MPX selects the instruction from the memory 107. The instruction from MPX 108 is fetched into a microaddress generator 109 which, in turn, generates a starting address of a microprogram stored in a microprogram memory 110 for executing the instruction from MPX 108. The desired microprogram is thereby read out of the memory 110 and then supplied to an instruction decode and timing control signal generator 111. In response thereto, the generator 111 generates various execution control signals 120 to execute the instruction. There signals among the control signals are supplied to MF 30 and another one of them is supplied to MF control circuit 20, as described hereinbefore. IEU 101 further includes a program counter (PC) 102 generating an instruction address for the program memory 200, a general purpose register set (GPR) 103, an arithmetic and logic unit (ALU) 104 for performing an arithmetic and/or logic operation on operation data, and a program status word register (PSW) 105 for temporarily storing an execution condition of IEU 101. MF 30 constitutes a part of PSW 105. CPU 40 further includes an interrupt control unit (INTC) 112 which responds to the interrupt request signal INTQ and generates an interrupt processing request signal INTP to the generator 111.

Next, an operation will be described below on a case where the mode selection terminal 8 is applied with logic "1" and a monitor program and an application program stored in the memory 200 are executed in the native mode and the emulation mode, respectively. First, by the microprogram for a system reset being read out of the microprogram memory 110 and executed, the system reset signal SR is produced to set MF 30 to logic "1". MPX 108 thereby selects the instruction from IDB 90. As a result, a monitor program for initializing GPR 103, INTC 112 and so forth of CPU 40 is executed in the native mode. When the execution of this monitor program is completed, CPU 40 receives and executes a mode switching instruction from the native mode to the emulation mode. As a result, the current contents of PC 102, GPR 103 and PSW 105 are saved in the stack area of the data memory 300 and the vector address for the application program is then loaded to PC 102. Further, the emulation mode switching signal EM is generated to clear MF 103 to logic "0". MPX 108 selects the instruction from the code conversion memory 107. The application program in the emulation mode is thus initiated. Each instruction codes of the application program in the emulation mode is converted into the corresponding native instruction code through the address control circuit 106 and the code conversion memory 107 and then supplied to IEU 101 via MPX 108. That is, CPU 40 executes the application program in the emulation mode.

Figure 4:
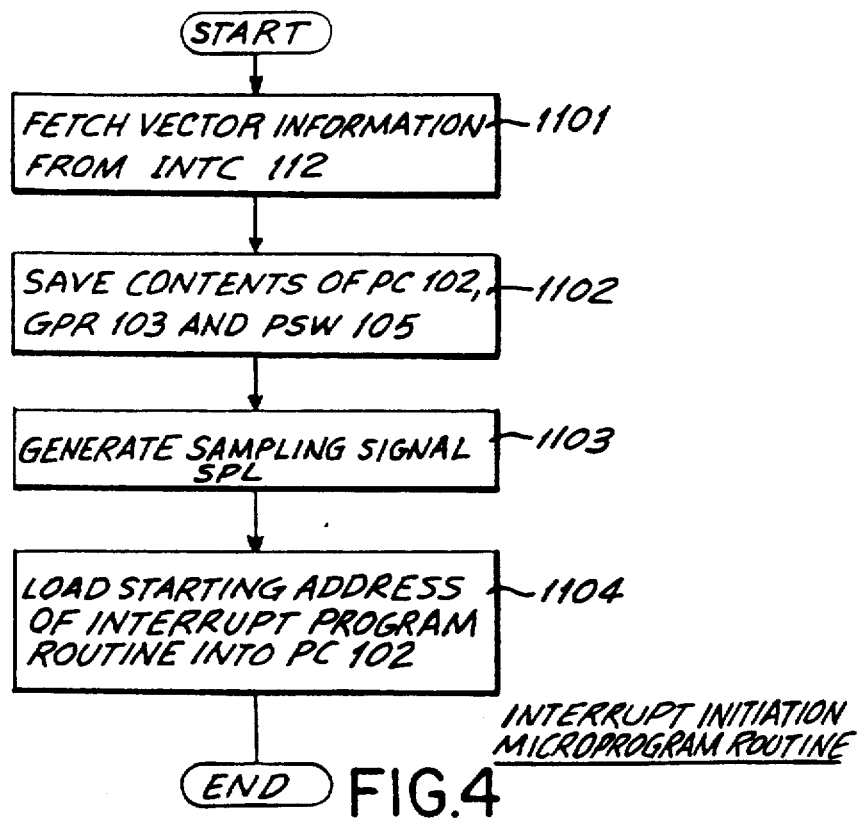
FIG. 4 is a flow chart representative of an interrupt initiation microprogram routine stored in a microprogram memory shown in FIG. 3.

When the break key of the key board 15 is operated during execution of the application program, the interrupt request signal INTQ is supplied from the I/O unit 400 to CPU 40. This request is informed to IEU 101 by INTP signal. In response thereto, IEU 101 suspends the execution of the application program and executes an interrupt initiation microprogram stored in the microprogram memory 110, a flow chart of which is shown in FIG. 4. In this microprogram routine, IEU 101 fetches the vector interrupt information from INTC 112 (step 1101) and saves the current contents of PC 102, GPR 103 and PSW 105 into the stack area of the data memory 300 (step 1102). Thereafter, a microinstruction for generating the sampling signal SPL is executed (step 1103). In response to SPL signal, MF control circuit 20 samples the logic level of MS signal at the terminal 10. Since the MS signal is logic 1, the set signal SS is produced to set MF 30 to logic "1". MPX 108 thereby selects the instruction on IDB 90. Subsequently, the starting address of an interrupt program is loaded to PC 102 (step 1104). The interrupt initiation microprogram is thus completed. CPU 40 executes a monitor program as an interrupt program in the native mode. A return instruction is positioned at the end of the interrupt monitor program. By executing the return instruction, the last-saved contents are returned to PC 102, GPR 103 and PSW 105, respectively. Since the logic "0" of MF 30 has been saved as a part of PSW 105 and now is returned to MF 30, the content of MF 30 is changed to logic "0". Accordingly, the suspended application program of the emulation mode is resumed.

On the other hand, when the interrupt program responsive to the above key operation is required to be executed in the emulation mode, the terminal 8 is applied with logic "0". MF 30 holds logic "0", so that the interrupt program is executed in the emulation mode.

The mode selection terminal 8 may be coupled to an externally provided register in place of the switch 110. The content of this register can be set or reset by a program.

Figure 5:
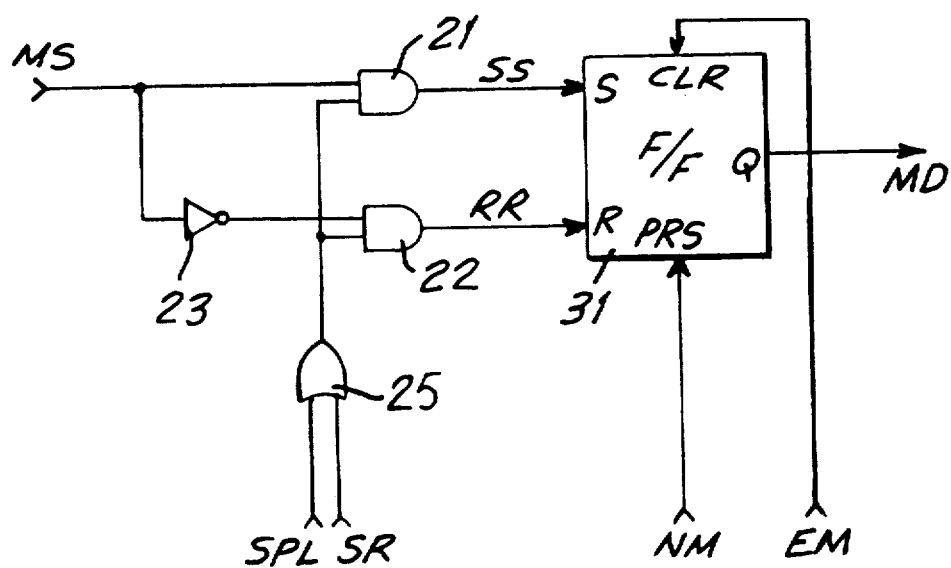
FIG. 5 is a circuit diagram representative of MF and MF control circuit of a microprocessor according to another embodiment of the present invention.

Referring to FIG. 5, there is shown MF control circuit and MF of a microprocessor according to another embodiment of the present invention, wherein the same constituents as those shown in FIG. 2 are denoted by the same reference numerals to omit the further description thereof. In this embodiment, the sampling signal SPL and the system reset signal SR are ORed by an OR gate 25. Accordingly, the program, which is initiated just after the system reset, is executed in the native or emulation mode in accordance with tho level at the terminal.

The present invention is not limited to the above embodiment, but may be modified and changed without departing scope and spirit of the invention.

What is claimed is:

1. A microprocessor for operating in a first operation mode using a first instruction set and a second operation mode using a second instruction set different from said first instruction set, the microprocessor comprising:

a mode flag;

means connected to said mode flag for setting said mode flag to one of a first and a second state, said first state designating said first operation mode and said second state designating said second operation mode;

a central processing unit coupled to said mode flag and operating in said first operation mode to execute a program comprising said first instruction set when said mode flag is set to said first state and in said second operation mode to execute a program comprising said second instruction set when said mode flag is set to said second state, said central processing unit including a microprogram memory for storing a microprogram used for executing the programs comprising said first and second instruction sets, and execution means coupled to said microprogram memory for executing said microprogram, said microprogram memory further storing a microinstruction for causing said execution means to generate a sampling signal, said execution means executing said microinstruction in response to one of an interrupt request and a system reset request;

a mode selection terminal; and means coupled to said mode selection terminal for supplying mode selection information to said mode selection terminal irrespective of address information generated from said central processing unit;

said setting means including a mode flag control circuit coupled to said mode selection terminal and said execution means and sampling said mode selection information at said mode selection terminal in response to said sampling signal to obtain sampled mode selection information, said mode flag control circuit setting said mode flag to one of said first and second states in response to said sampled mode selection information.

2. The microprocessor as claimed in claim 1, wherein said microprogram memory is constructed so as to store an interrupt initiation microprogram and said execution means further executes said interrupt initiation microprogram in response to the interrupt request supplied thereto to generate said sampling signal.

3. The microprocessor as claimed in claim 1, wherein said microprogram memory is constructed so as to store a system reset microprogram and said execution means further executes said system reset microprogram in response to the system reset request supplied thereto to generate said sampling signal.

4. The microprocessor as claimed in claim 1, wherein said mode flag includes a flip-flop circuit and an OR-gate connected thereto.

5. The microprocessor as claimed in claim 1, wherein said mode flag control circuit includes two AND gates connected to said mode flag and an inverter interconnected between said AND gates.

6. A microprocessor having a first operation mode and a second operation mode and comprising:
   a mode flag for designating one of said first and second operation modes,
   means coupled to said mode flag for bringing said mode flag into one of set and reset states, said set and reset states of said mode flag designating said first and second operation modes, respectively;
   means for issuing an interrupt request;
   a central processing unit coupled to said mode flag and executing a program in one of said first and second operation modes designated in said mode flag, said central processing unit including a microprogram memory for storing an interrupt initiation microprogram, reading-out means coupled to said microprogram memory and responsive to said interrupt request supplied thereto for reading out said interrupt initiation microprogram from said microprogram memory, and executing means coupled to said microprogram memory for executing said interrupt initiation microprogram read out of said microprogram memory to generate a sampling signal;
   a mode terminal;
   means coupled to said mode terminal for supplying operation mode information to said mode terminal irrespective of address information generated by said central processing unit; and
   sampling means coupled to said mode terminal and said central processing unit and being responsive to said sampling signal for sampling a logic level of said operation mode information at said mode terminal;
   said bringing means being coupled to said sampling means and being responsive to the sampled logic level from said sampling means for bringing said mode flag into one of said set and reset states.

7. The microprocessor as claimed in claim 6, wherein said microprogram memory is constructed so as to further store a system reset microprogram and said central processing unit further includes means responsive to a system reset request supplied thereto for causing said reading-out means to read out said system reset microprogram from said microprogram memory, said executing means further executing said system reset microprogram to generate and supply a system reset signal to said sampling means, said sampling means further responding to said system reset signal to sample the logic level of said operation mode information to produce a further sampled logic level, said bringing means being further responsive to said further sampled logic level for bringing said mode flag into one of said set and reset states.

8. A microprocessor for executing an instruction supplied from a program memory, comprising receiving means for receiving said instruction to output a supplied instruction; converting means coupled to said receiving means for converting said supplied instruction into a converted instruction; a mode flag producing a control signal which takes a first logic level when said mode flag is in a first state and a second logic level when said mode flag is in a second state; selecting means coupled to said receiving means and said converting means to receive said supplied instruction and said converted instruction, said selecting means being further coupled to said mode flag to receive said control signal for selecting said supplied instruction when said control signal takes said first logic level and said converted instruction when said control signal takes said second logic level to output a selected instruction representative of a selected one of said supplied instruction and said converted instruction; a microprogram memory; reading-out means coupled to said selecting means and said microprogram memory for reading out a microprogram for said selected instruction from said microprogram memory in response to said selected instruction; executing means coupled to said microprogram memory for executing the microprogram read-out from said microprogram memory, said microprogram memory further storing a sampling signal generation microprogram; control means coupled to said reading-out means and responsive to one of an interrupt request and system reset request for causing said reading-out means to read out said sampling signal generation microprogram from said microprogram memory, said executing means further executing said sampling signal generation microprogram to generate a sampling signal; a mode terminal; sampling means coupled to said mode terminal and said executing means and being responsive to said sampling signal for sampling a logic level of said mode terminal to produce a sampled logic level; and means coupled to said sampling means and said mode flag for bringing said mode flag into one of said first and second states in response to said sampled logic level.

9. The microprocessor as claimed inc claim 8, wherein said control means includes means for receiving the interrupt request, said control means responding to said interrupt request to cause said reading-out means to read out said sampling signal generation microprogram from said microprogram memory.

10. The microprocessor as claimed in claim 8, wherein said control means includes means for receiving the system reset request, said control means responding to said system reset request to cause said reading-out means too read out said sampling signal generation microprogram from said microprogram memory.

* * * * *